United States Patent [19]

Ludwig et al.

[11] 4,248,943

[45] Feb. 3, 1981

[54] SODIUM SULFUR CONTAINER WITH CHROMIUM/CHROMIUM OXIDE COATING

[75] Inventors: Frank A. Ludwig, Irvine; Lin R. Higley, Santa Ana, both of Calif.

[73] Assignee: Ford Motor Company, Dearborn, Mich.

[21] Appl. No.: 142,554

[22] Filed: Apr. 21, 1980

[51] Int. Cl.³ .............................................. H01M 2/02
[52] U.S. Cl. .................................... 429/104; 429/164
[58] Field of Search ............... 429/104, 102, 103, 163, 429/176, 164; 220/454

[56] References Cited

U.S. PATENT DOCUMENTS

| | | | |
|---|---|---|---|
| 3,959,013 | 5/1976 | Breiter | 429/185 |
| 4,048,390 | 9/1977 | Chaterji et al. | 429/102 |
| 4,048,391 | 9/1977 | Tilley et al. | 429/104 |
| 4,084,040 | 4/1978 | King | 429/104 |
| 4,110,516 | 8/1978 | Breiter | 429/104 |
| 4,117,209 | 9/1978 | Markin et al. | 429/104 |
| 4,131,226 | 12/1978 | Breiter et al. | 429/104 X |
| 4,209,573 | 6/1980 | Chatterji et al. | 429/104 |

OTHER PUBLICATIONS

Plating 56, pp. 37–43, 1969.
Metal Finishing Journal 19, pp. 139–149, 1973.

*Primary Examiner*—Anthony Skapars
*Attorney, Agent, or Firm*—William E. Johnson; Olin B. Johnson

[57] ABSTRACT

A coating of chromium/chromium oxide is disclosed for coating the surfaces of electrically conducting components of a sodium sulfur battery. This chromium/chromium oxide coating is placed on the surfaces of the electrically conducting components of the battery which are in contact with molten polysulfide and sulfur reactants during battery operation.

7 Claims, No Drawings

4,248,943

SODIUM SULFUR CONTAINER WITH CHROMIUM/CHROMIUM OXIDE COATING

This invention was made under contract with or subcontract of the Department of Energy, Contract #DE-AMO2-79CH-1002.

BACKGROUND OF THE INVENTION AND PRIOR ART STATEMENT

The sulfur reactant container in a sodium sulfur battery is subject to attack in contact with molten sodium polysulfide and sulfur reactants. The prior art has proposed many different materials for combating this corrosion problem.

In U.S. Pat. No. 3,959,013, a proposal is made to use a corrosion resistant and electronically conducting layer of molybdenum or graphite to reduce the corrosion associated with such a battery. The corrosion resistant coating is placed on the surface of the metallic container which is to confine the molten sodium polysulfide and sulfur reactants.

In a similar manner, U.S. Pat. No. 4,048,390 suggests that a protective coating of aluminum be placed on the surface of the battery container which is to confine the polysulfide and sulfur reactants. This patent proposes the use of aluminum because it forms a continuous layer of aluminum sulfide over its exposed surfaces.

U.S. Pat. No. 4,110,516 takes still another direction in trying to develop a corrosion resistant container to confine the sodium polysulfide and sulfur reactants. This patent suggests forming the confining container of aluminum and then placing over the aluminum either a single layer of chrome or a layer of zinc with a layer of chrome thereover, the chrome surface being the surface which faces up against the corrosive reactants which are to be confined therewithin.

U.S. Pat. No. 4,131,226 once again discloses a sulfur containing container for a sodium sulfur battery in which a liner material is used as an anticorrosive surface for a mild steel container. The patent teaches that the discreet liner of clad material can be formed of metal such as stainless steel, molybdenum or a nickel/chromium alloy, as specifically disclosed therein.

The above patents constitute the best prior art known to us in this area. No search was conducted in the U.S. Patent Office on this subject matter.

We propose that the protective coating for the container which is to confine the molten sodium polysulfide and sulfur reactants be protected by a chromium/chromium oxide coating. If the metal container is formed of a material such as mild steel, and it is protected from corrosion by the polysulfide materials with a noncorroding coating of reasonable conductivity, then the metal of the container provides the high axial conductivity required for current collection in a cylindrical cell while it provides the corrosion protection.

Chrome oxide is fairly noncorrodible in polysulfide melts. It does not, however, have a sufficient conductivity. But, when alloyed with chromium, the resultant chromium/chromium oxide combination does have the required conductivity while retaining the noncorrodibility of the chromium oxide. Under attack by the polysulfide melts, the chromium in the alloy corrodes to form a chromium sulfide corrosion product which fills the pores in the alloy sealing the same off. The chromium sulfide is a good conductor, and it also protects the underlying chromium from further corrosion. The chromium oxide matrix serves as an anchor for retention of the protective chromium sulfide layer.

It is well known to those skilled in the art of constructing sodium sulfur cells that chromium and stainless steels are protected from further corrosion by a chromium sulfide corrosion scale. However, when the chromium is there by itself, this scale has a tendency to spall or flake off unless it is retained within a porous matrix by a noncorrodible material.

The principal objects of this invention are to provide an improved protection system for a sodium sulfur battery wherein the metal current collector and/or container is coated with an alloy or cermet which is nearly as conductive as a metal, nearly as inert to corrosion as an oxide, and a coating which protects the substrate from defects and porosity in the coating by means of a protective, nonsluffing corrosion scale.

SUMMARY OF THE INVENTION

This invention relates to a sodium sulfur battery and more particularly to a coating for portions of a sodium sulfur battery which come into contact with molten polysulfide and sulfur reactants during battery operation.

In accordance with the teachings of this invention, a sodium sulfur battery is improved as follows. The electrically conducting components of the battery are formed of a metal or a metal alloy. These electrically conducting components have a chromium/chromium oxide coating on the surfaces thereof which come into contact with molten polysulfide and sulfur reactants during operation of the battery. If desired, the electrically conducting components can be fabricated from iron or an iron alloy. As an additional matter, a layer of chromium may be located between the electrically conducting component and the chromium/chromium oxide coating thereover.

In accordance with teachings of preferred embodiments of the invention, the chromium/chromium oxide coating has a thickness in the range from 0.1 mills to 4 mills and an oxygen content in a range from 2% to 30% by weight.

DESCRIPTION OF THE PREFERRED EMBODIMENTS

The novel features that are considered characteristic of the invention are set forth with particularity in the appended claims. The invention itself, however, both as to its organization and its method of operation, together with additional objects and advantages thereof, will best be understood from the following description of specific embodiments.

It has been determined in previous work that metal containers electroplated with chromium can be constructed into sodium sulfur cells in which the plated container serves as the cermet collector/container and only the chromium coating is in contact with polysulfide salts and in pressure contact with a graphite felt electrode structure normally used in such a battery. Such cells have given satisfactory performance for one year or 500 cycles of accelerated testing, which is equivalent to two years of normal service life. During that time, the cells deteriorated only a few percent in their energy capacity and charge/discharge energy efficiency. On dissection, the chrome surfaces were found to be protected by a thin layer of adherent chromium sulfide corrosion scale. Some cells which corroded more heavily were found to have a thick corrosion scale which was nonadherent. There was evidence of repeated sluffing of thinner layers to build up a thick section of a nonadherent, multilayered chromium sulfide corrosion product.

By contrast, chromium oxide is much more resistant to corrosion than chromium. When inconel 671 is oxidized at 750° C. in air for two hours, a thin layer, 3000 Å thick, of pure chromium oxide is produced on the inconel surface. In $Na_2S_4$ at 400° C., unoxidized inconel 671 corrodes at a rate of 30 mg/cm²/month; oxidized inconel corrodes at a rate of 0.03 mg/cm²/month the chromium oxide 3000 Å thick layer itself corrodes at a rate of 0.004 mg/cm²/month; and chromium metal corrodes at a rate of 2 mg/cm²/month. Thus, the chromium corrodes at a rate 500 times higher than chromium oxide.

Ten years of life is required for load leveling batteries. Only two years of satisfactory performance based on container corrosion is presently being obtained in some sodium sulfur cells containing chromium plated metal containers. It is anticipated that ten years life may be possible if sufficient chromium oxide can be included in a chromium coating and if the chromium oxide matrix provides an anchor to keep the protective chromium sulfide corrosion scale which does form some sluffing off of the surface of the chromium/chromium oxide cermet surface.

The substrate metal can be coated with the chromium/chromium oxide cermet by a number of processes, such as aqueous electroplating, flame spraying, plasma spraying, or chemical vapor deposition from chromium carbonyl. One of the easiest processes is aqueous electroplating. In the state of the art this process is known as "black chrome plating", as exemplified in review articles appearing in *Plating* 56, p. 37-43, (1969), and in *Metal Finishing Journal* 19, p. 139-149, (1973). In these articles, the reported composition of the deposit ranges from 56 to 75% chromium and over 26% oxygen found by chemical analysis for the lower amounts of chromium.

In CVD deposits from chromium carbonyl, the reported chromium metal content ranged from 40% to 95% chromium metal with most of the balance being $Cr_2O_3$ with some $Cr_3C_2$. The oxygen can range from 2 weight % to approximately 30 weight %. Corrosion protection is improved with increasing weight % oxygen. At 30 weight % oxygen, 95% of the cermet is $Cr_2O_3$ and 5% is chromium metal. This amount of metal has been found to be sufficient to retain high electronic conductivity of the coating, even for thicknesses of black chrome of 0.002 inches. In fact, due to the decrease in thickness of the chromium sulfide protective scale, the cells built with black chromium coatings have equaled the lowest resistances of any cells built from containers using conventional electroplated chromium.

The black chromium deposits contain approximately 10 weight % water. It is desirable to remove this water by heating the container after plating to approximately 165° C. in air for several hours. The water is more effectively removed by heating to 400° C. in air or argon for 30 minutes.

There are many "Black Chrome" plating processes described in the literature. Many of these processes were tested in the laboratory. Black chrome deposits of widely varying characteristics were found. Attempts were made to optimize the coatings with respect to the following characteristics: good adhesion to the substrate steel or stainless steel or chromium plated steel metal, reasonable black chrome thickness (0.1 to approximately 2.0 mils) obtained at high plating speed, good uniformity of coating over the entire container surface, low porosity, high weight percent oxygen, low electrical resistance. One process that yielded such an optimum coating was the bath developed by J. B. Nelson, U.S. Pat. No. 3,419,481, when operated at 35°-40° C., preferably 37=0.5° C., and at current densities above 25 A/dm². On a dry conventional chromium plated substrate, a three second 25 A/dm² anodic cyanide pretreatment or a short reverse plate in the Nelson bath was required as an activation step. Activation procedures are also required for steel and stainless steel substrates.

The black chrome coating greatly enhances the corrosion resistance of a mild steel cathode reactant current collector/container. A preferred approach is to plate a thin layer of crack-free pure chrome less than 0.5 mil thick to the steel and then plate the black chrome. Black chrome can also be plated directly onto various grades of stainless steel to enhance corrosion resistance when they are used as cathode reactant current collector/containers. Such a coating can also be placed on a current collector used in polysulfide melts confined inside beta alumina as is used in some battery constructions.

The thickness of black chrome deposits tested in sodium sulfur cells has varied from 0.1 to approximately two mils. It is anticipated that the best corrosion resistance will be obtained by the thicker coatings. The cells have operated for 75 cycles to date and no deterioration in electrical performance of the cells has been observed.

In order to still further illustrate the improvement of the invention, several specific examples are set forth below. The plating processes described in the examples produced the desired properties mentioned previously. However, many of the black chrome processes summarized in the review paper in "Metal Finishing, 19," p. 139-142, were tried; it is anticipated that all of these processes will enhance the corrosion resistance of the substrate metal and tahe examples given below serve to illustrate only one of the processes which has been optimized for application to sodium sulfur cathode reactant current collectors or current collector/containers.

EXAMPLE 1

A cathode reactant current collector/container tube for a sodium sulfur cell of 1010 steel has dimensions of 270 mm length×48 mm I.D.×1.5 mm wall thickness. This tube is electropolished in an electrolyte prepared by dissolving 15 wt. % of 96% $H_2SO_4$, 63 wt. % of 85% $H_3PO_4$, and 10 wt. % $CrO_3$ into distilled water. A stainless steel or lead alloy cathode 270 mm long and 38 mm in diameter was inserted and fixed inside the degreased 1010 steel tube. The electropolishing was carried out for ten minutes at 440 amps at 75° C. After electrolysis, the tube was washed with water until it was free of phosphate ion. A very smooth, bright part was obtained. The tube was not permitted to dry prior to immersion in the next bath. This next bath is a commercial M&T Chemical Co. CF 500 crack-free chromium plating bath operated at the recommended concentration and at a current density of 22 A/dm² and a bath temperature of 52° C. for 13 minutes to give a chromium deposit 0.10 mils thick. The anode is this bath was lead alloy, but otherwise was the same size and located identically inside the tube as was the cathode in the electropolish bath. After electroplating, the tube was washed in water until free of sulfate ion.

Subsequently, without allowing the said tube to dry, it was immersed into the black chrome bath. This bath was prepared by dissolving into sulfate-free water 450 grams/liter (g/l) chromic acid, 2.0 g/l of 49% hydrofluoric acid, 2.1 g/l of 1.42 specific gravity nitric acid, and 7.5 g/l of barium carbonate. A clean lead alloy anode 38 mm in diameter and 270 mm long was fixed concentrically inside the tube. The said tube was then cathodically plated at 38 A/dm$^2$ constant current for one minute, followed by 31 A/dm$^2$ for 27 minutes, with the bath temperature kept between 35°–37° C. The tube was then water washed until free of chromate ion and was dryed for several hours at 165° C. A low porosity matt, black deposit 2.0 mils thick was obtained.

EXAMPLE 2

A ferritic or austenitic stainless steel tube is used in place of, but otherwise of the same dimensions, as the 1010 steel tube in the previous example. An identical procedure to that of Example 1 is followed, except that the electropolishing step is omitted and in its place the tube is given an anodic treatment using a 38 mm diameter stainless steel or cleaned lead alloy cathode in a bath consisting of 56 Wt. % of 85% phosphoric acid and 12 wt. % CrO$_3$. The bath was operated at 35° C. with the current set at 25 A/dm$^2$ for one minute.

EXAMPLE 3

A 1010 steel tube is electropolished as in Example 1, rinsed with sulfate-free water, and immersed without drying directly into the black chrome bath thereby eliminating a chrome plate.

EXAMPLE 4

A ferritic or austenitic stainless steel tube is anodically activated as in Example 2 and then carefully rinsed with sulfate-free water and directly immersed without drying into the black chrome bath thereby eliminating a chrome plate.

EXAMPLE 5

The procedures of Examples 1–4 are followed, except that after the final plate, the tube is dried for 30 minutes between 350° and 400° C. in argon or air.

EXAMPLE 6

The procedures of Examples 1 and 2 are followed, except the chromium plating bath is operated at 65° C. instead of 52° C.

EXAMPLE 7

The procedures of Examples 1, 2, 5 or 6 are followed, except the chromium plating time is extended from 13 minutes to 1–3 hours.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed is:

1. In a sodium sulfur battery the improvement which comprises:
   electrically conducting components of said battery comprised of a metal or a metal alloy having a chromium/chromium oxide coating on surfaces in contact with molten polysulfide and sulfur reactants during battery operation, the oxygen content of said chromium/chromium oxide coating being at least 2% by weight.

2. In a sodium sulfur battery the improvement which comprises:
   electrically conducting components of said battery comprised of iron or an iron alloy having a chromium/chromium oxide coating on surfaces in contact with molten polysulfide and sulfur reactants during battery operation, the oxygen content of said chromium/chromium oxide coating being at least 2% by weight.

3. The improved sodium sulfur battery of claims 1 or 2, wherein:
   a layer of chromium is located between the electrically conducting component and said chromium/chromium oxide coating thereover.

4. The improved sodium sulfur battery of claims 1 or 2, wherein:
   said chromium/chromium oxide coating has a thickness in the range from 0.1 mils to 4 mils.

5. The improved sodium sulfur battery of claims 1 or 2, wherein:
   said chromium/chromium oxide coating has an oxygen content no more than about 30% by weight.

6. In a sodium sulfur battery the improvement which comprises:
   electrically conducting components of said battery comprised of iron or an iron alloy having a chromium/chromium oxide coating on surfaces in contact with molten polysulfide and sulfur reactants during battery operation, said chromium/chromium oxide coating having a thickness in a range from 0.1 mils to 4.0 mils and an oxygen content in a range from 2% by weight to 30% by weight.

7. The improved sodium sulfur battery of claim 6, wherein:
   a layer of chromium is located between the electrically conducting component and said chromium/chromium oxide coating.

* * * * *